(12) United States Patent
Shim

(10) Patent No.: US 8,926,842 B2
(45) Date of Patent: Jan. 6, 2015

(54) WATER TREATMENT SYSTEM AND METHOD USING HIGH PRESSURE ADVANCED OXIDATION PROCESS WITH UNREACTED OZONE REUSING

(76) Inventor: Jong Seob Shim, Kwangju-si (KR)

( * ) Notice: Subject to any disclaimer, the term of this patent is extended or adjusted under 35 U.S.C. 154(b) by 1052 days.

(21) Appl. No.: 12/674,157

(22) PCT Filed: Aug. 30, 2007

(86) PCT No.: PCT/KR2007/004176
§ 371 (c)(1),
(2), (4) Date: Feb. 18, 2010

(87) PCT Pub. No.: WO2009/028746
PCT Pub. Date: Mar. 5, 2009

(65) Prior Publication Data
US 2011/0031187 A1    Feb. 10, 2011

(51) Int. Cl.
C02F 1/24 (2006.01)
C02F 1/32 (2006.01)
C02F 1/78 (2006.01)
C02F 9/02 (2006.01)
C02F 9/12 (2006.01)

(52) U.S. Cl.
CPC . *C02F 1/78* (2013.01); *C02F 1/325* (2013.01); C02F 1/24 (2013.01); C02F 2201/326 (2013.01); C02F 2209/40 (2013.01)
USPC ...... 210/703; 210/760; 210/761; 210/748.14; 210/748.13; 210/806; 210/205; 210/221.2

(58) Field of Classification Search
USPC ........... 210/703, 760, 763, 221.1, 221.2, 205, 210/206, 761, 748.14, 748.13, 806
See application file for complete search history.

(56) References Cited

U.S. PATENT DOCUMENTS

| 4,029,578 A | * | 6/1977 | Turk | 210/760 |
| 5,178,755 A | * | 1/1993 | LaCrosse | 210/195.1 |
| 5,180,499 A | * | 1/1993 | Hinson et al. | 210/706 |
| 5,240,600 A | * | 8/1993 | Wang et al. | 210/188 |
| 6,773,609 B1 | | 8/2004 | Hashizume | |

FOREIGN PATENT DOCUMENTS

| JP | 2002-119979 | 4/2002 |
| JP | 2003-094075 | 4/2003 |
| KR | 10-0646861 | 11/2006 |
| WO | WO 97/29997 | * 8/1997 |

OTHER PUBLICATIONS

International Search Report for PCT/KR2007/004176 mailed Apr. 21, 2008.

* cited by examiner

*Primary Examiner* — Thomas M Lithgow
(74) *Attorney, Agent, or Firm* — Revolution IP, PLLC

(57) ABSTRACT

A water treatment system using a high pressure advanced oxidation process with unreacted ozone reusing is disclosed, which are able to increase a decomposition speed of a pollutant by reusing a high pressure advanced oxidation process which uses an ozone and photocatalyst and a photo-oxidation reaction of a ultraviolet ray. The capacity of the expensive ozone generator can be reduced as compared to the conventional advanced oxidation process which uses a large capacity ozone generator in which almost ozone is discharged into the air. In addition, it is possible to decrease the load of the off-gas ozone removing apparatus for removing the off-gas ozone which is discharged into the air.

3 Claims, 4 Drawing Sheets

WATER TREATMENT SYSTEM AND METHOD USING HIGH PRESSURE ADVANCED OXIDATION PROCESS WITH UNREACTED OZONE REUSING

RELATED APPLICATIONS

This application is a 371 application of International Application No. PCT/KR2007/004176, filed Aug. 30, 2007, which is incorporated herein by reference in its entirety.

TECHNICAL FIELD

The present invention relates to a water treatment system using a high pressure advanced oxidation process with unreacted ozone reusing, and in particular to a water treatment system using a high pressure advanced oxidation process with unreacted ozone reusing and a method of the same which are able to increase a decomposition speed of a pollutant by reusing a high pressure advanced oxidation process with unreacted ozone reusing and photocatalyst and a photo-oxidation reaction of a ultraviolet ray.

BACKGROUND ART

A water treatment method using an advanced oxidation process (AOP) is directed to a technology which generates an OH radical (OH°, Hydroxy radical) having a strong sanitization and oxidizing power as an intermediate material by using an oxidation agent such as ozone or $H_2O_2$ or by scanning a ultraviolet rat to the oxidation agent for thereby oxidizing and decomposing an organic pollutant in a waste water. The above water treatment method is an advanced technology which is used to decompose a undecomposable substance such as a synthetic washing agent, agricultural chemical, etc. which are not well decomposed by a common treatment method and is used to decompose a high concentration pollutant for a short time period. In recent years, as an environment pollution becomes a serious problem, and a new material, which cannot be decomposed by a common treatment method, is developed, a new technology is needed with respect to a waste treatment method which has an excellent process efficiency as a lot of undecomposable substance is inputted into a waste water. In addition, according to the amended law in the Korean law, it became a duty matter that a heavy water facility is installed in an architecture having a certain dimension. In case of a city building which is hard to adapt a biochemical treatment method, and in case of a conventional factory which is hard to increase a treatment capacity of a waste water, and in case that a lot of waste water should be treated in a limited treatment space, the application of a water treatment method using an advanced oxidation is widened, which has a high treatment efficiency of a waste water and is able to treat a lot of water for a short time without bad smell in a small area.

In recent years, various trials are conducted for enhancing a decomposition efficiency of an advanced oxidation process. A multiple reaction tub may be installed so as to enhance a contact surface area of ozone. According to a DOF (Dissolved Ozone Flotation) method, ozone is compressed using a compressor so as to enhance solubility and is inputted into a waste water which is pressurized with a high pressure and is discharged to a waste water with a normal pressure for thereby forming ozone foams and floating the same. The pollutant and micro ozone are reacted with each other. According to the DOF, it is possible to obtain a less size foam and a larger size surface area as compared to when foam is generated by means of a conventional ejector. So, it is possible to increase decomposition reaction efficiency as a contact efficiency of ozone increases.

In addition, there is a method for inducing a decomposition reaction of ozone in an area near a lamp in consideration with a characteristic of an ultraviolet ray (254 nm) having a low water penetration power as an ultraviolet ray is scanned so as to increase a decomposition efficiency of ozone, a porous plate is installed near an ultraviolet lamp, and ozone passes through near a lamp. In the above operation, it is expected that a decomposition reaction efficiency is enhanced based on an OH radical generated as a photocatalyst scanned by an ultraviolet ray decomposes ozone by coating a photocatalyst on the porous plate. The water treatment apparatus and method using an advanced oxidation process is disclosed in the Korean patent laid-open number 109288, the patent registration number 289275 and the patent registration number 541573.

However, the above patents have the problems. Namely, the Korean patent registration number 109288 and the patent registration number 289275 disclose the DOF in which the ozone is pressurized using a compressor so as to purify waste water, and the pressurized ozone is inputted into the waste water which was pressurized using a pump and is dissolved, and is inputted into waste water under normal pressure for thereby generating a micro foam ozone and increasing the contact surface. In the above method, it is possible to enhance a decomposition reaction efficiency as the contact surface area increases with respect to the pollutant with small size foams as compared to the floating method by means of an ejector having relatively large foams, but the amount of the ozone to be dissolved under water under the normal pressure is very limited, so that almost ozone inputted remain in a foam type, and the decomposition reaction of the ozone and pollutant is performed via a gas-liquid surface. Therefore, the reaction speed is slow. As the pollutant foam size decreases, the contact surface area increases, so that the decomposition reaction speed may slightly increase. However, since the inputted ozone is fast floated above the water and escapes, the amount of the gaseous ozone is relatively less, so that there is a limit for enhancing the reaction efficiency.

The conventional advanced oxidation process is related with a technology which decreases the sizes of foams. The method for treating the waste water based on the DOF which performs a reaction almost via a gas-liquid surface is performed using an inherent oxidation power of ozone which is able to oxidize and decompose almost organic pollutants by enhancing a contact efficiency between ozone and pollutant. The above method is faster than a biological decomposition method. In a lot of pollutants, the decomposition reaction speed is disadvantageously slow, and the volume of the reaction apparatus disadvantageously decreases. There are substances which do not react, and a lot of undecomposable substance such as agricultural chemicals, synthetic washing agent, etc. may be inputted into sewage or waste water, so that there are limits for treating the above water problems with only ozone.

So as to improve the disadvantages of the ozone, ozone is decomposed by concurrently reacting oxidizing agent such as $H_2O_2$ and ultraviolet ray for thereby creating an OH radical having a strong oxidizing power. As a method for decomposing pollutants based on the created OH radical, there is an advanced oxidation process such as ozone+$H_2O_2$, ozone+ultraviolet ray, ozone+photocatalyst+ultraviolet ray, ozone+photocatalyst+ultraviolet ray, ozone+ultrasonic wave, etc.

The Korean patent registration number 541573 discloses a method for an advanced oxidation process which uses ozone+ photocatalyst+ultraviolet ray in which ozone is inputted via a lower side of the reactor and is dispersed via a porous plate formed at a surrounding portion of an ultraviolet lamp and is decomposed, so that a decomposition reaction is performed based on a photocatalyst coated on the surface of the porous hole. Since the inputted ozone is present in a foam state, as the input amount of ozone increases, the amount of foams increases for thereby retarding the irradiation of ultraviolet ray, and the size of ozone foam increases, so that the contact efficiency with the pollutant decreases, and the creating amount of the OH radical generated based on the decrease of the oxidation reaction and by means of a reaction of the ultraviolet ray. In the above patents, there is provided a water treatment apparatus which has a porous plate coated with a photocatalyst through which the ultraviolet lamp passes so as to enhance a reaction between the ozone and the ultraviolet ray. However, the number of the porous plate is limited for the reason of the pressure loss. It is impossible to increase the creation of the OH radical based on an ultraviolet ray decomposition reaction and a photocatalyst reaction owing to the retardation of the ultraviolet ray scanning due to the ozone foams. As a result, the surface area of the photocatalyst coating cannot increase owing to the increasing pressure loss by means of the installed porous plate, so that there is a limit in the presses capacity. Namely, there is a limit for enhancing the decomposition reaction efficiency since the solubility of the ozone inputted in a foam shape, and the transmission of the ultraviolet is interfered.

In the advanced oxidation process using a conventional DOF, the ozone is pressurized to a high level using the compressor, and the waste water is pressurized using a pressurizing pump, and a high pressure ozone is inputted into the waste water and is dissolved and then is discharged with a normal pressure, so that a micro size ozone foam is generated and is floated upward for thereby along the floating substance to move up and react with the pollutant, whereby the pollutant are removed. The water treatment method based on the DAF (Dissolved Air Flotation) and the DOF (Dissolved Ozone Flotation) are disclosed in the Korean patent laid-open number 10-2006-0026698, the Korean patent laid-open number 10-2005-0109288, the Korean patent registration number 0321800, and the Korean patent registration number 0420561. In the floating substance and pollutant removing method using the micro size foam type air or ozone floatation, the waste water is sucked and compressed by means of the pressure pump, and the ozone generated by the air and ozone generator is compressed by means of the compressor and is forcibly inputted into a high pressure waste water and is dissolved. A method of using an exclusive pump, for example, a DAF pump is considered.

In the air flotation method, the floating substance contacts with micro foams and is floated upward for thereby removing the same. A lot of air is dissolved with a high pressure so as to enhance the efficiency of the air floatation method and is inputted into a waste water of a normal pressure for thereby forming micro foams. In a method for enhancing a floating substance removing efficiency, a specially designed DAF exclusive pump may be used, and a high pressure air compressed using the compressor is mixed and dissolved by means of a high pressure waste water pressurized by the pressurizing pump and is inputted into a floatation tub. However, in this method, an air compression compressor or an exclusive DAF pump is disadvantageously needed.

In the conventional advanced oxidation process, since unreacted ozone is properly not used, but is just discharged into the air or it is decomposed using a decomposition apparatus and is discharged, the use efficiency of the ozone is very low. Since an expensive ozone generator is used, and a cost is increased since it is needed to increase a capacity of a unreacted ozone decomposition apparatus. The apparatus needed for an advanced oxidation process should be big so as to increase the contact area needed for enhancing a decomposition reaction efficiency of a pollutant, so that an installation and operation cost increases.

In addition, almost ozone is not properly used since a technology related with a pollutant removing process using a conventional advanced oxidation process adapts a unreliable treatment method with respect to a unreacted ozone. Namely, such ozone is directly discharged into the air or is simply decomposed using an off-gas ozone decomposition apparatus. Since an ozone generator is expensive, it is impossible to expect a high application of the ozone because the ozone is generated using an expensive apparatus. An environmental problem may occur, and an installation cost and an operation cost are too high.

DISCLOSURE

Technical Problem

Accordingly, it is an object to provide a waste water treatment method using a high pressure advanced oxidation process with unreacted ozone reusing which is able to increase a pollutant decomposition efficiency and to minimize a unreacted ozone discharge amount through a decomposition efficiency maximization of an advanced oxidation process and a unreacted ozone reuse technology development. In addition, it is possible to decrease a size of an expensive ozone generator and an advanced oxidation process waste water treatment apparatus for thereby decreasing an installation cost and operation cost.

Technical Solution

To achieve the above objects, in a waste water treatment system and method using a high pressure advanced oxidation process with unreacted ozone reusing according to the present invention, a lot of ozone generated by an ozone generator 70 is pressurized along with a waste water with a high pressure, and is inputted into a high pressure photo-oxidation decomposition apparatus 60 in a dissolved state with no foam. A lot of dissolved ozone contacts with pollutants and is oxidized and decomposed. Namely, an ozone decomposition reaction is performed by means of ultraviolet ray without ozone foams. A reaction for decomposing pollutant by means of an OH radical generated by a photo-oxidation reaction which decomposes ozone based on a photocatalyst reaction is properly performed, so that a decomposition reaction speed of a pollutant increases, and a reaction range increases, and the unreacted ozone, which is not reacted in the above reaction, is inputted into a secondary pretreatment floatation tub 32 and a gas-liquid separation flotation tub 40 along with a high pressure reaction substance, so that the ozone is changed to a micro foam ozone foam which is floated upward in the flotation tub and absorbs the flotation substance and floats on the water. The ozone foams are transferred to a scum removing unit 31d along with the gas and are separated from the scum. So, the remaining ozone is removed based on a first dissolved ozone/air flotation separation method. The unreacted ozone collected at the upper sides of the secondary pretreatment flotation tub 32 and the gas-liquid separation flotation tub 40 is pressurized with a high pressure along with the waste water and is inputted into the first pretreatment flotation tub 31 in the secondary dissolved ozone/air flotation separation method. Almost part of the ozone is removed through a series unreacted ozone reuse process which removes the floating substance and pollutant of the waste water. The remaining unreacted ozone is removed by means of the off-gas ozone removing apparatus 50 based on the environment standard and is discharged into the air. So, it is possible to decrease the size of the off-gas ozone decomposition apparatus 50. The load of the pollutant inputted into the high pressure photo-oxidation decomposition apparatus 60 using a unreacted ozone can be decreased. The processing speed of the pollutant of the high pressure photo-oxidation decomposition apparatus 60 may increase, so that a waste treatment capacity can be enhanced. The capacity of the expensive ozone generator 50 can be decreased with the help of the above combined functions. The installation cost and operation cost of the waste water treatment apparatus can be decreased, and the advanced oxidation process waste water treatment apparatus 100 can be made in a compact size.

In addition, in a waste water treatment system and method using a high pressure advanced oxidation process with unreacted ozone reusing according to the present invention, the source water pressurized by means of the photo-oxidation pressurizing is passed through the high pressure ozone reaction apparatus 90 and is inputted into the high pressure photo-oxidation reaction apparatus 60 and is water-treated by means of an ozone reaction before a photo-oxidation reaction for thereby enhancing a reaction efficiency based on the photo-oxidation.

In a waste water treatment system and method using a high pressure advanced oxidation process with unreacted ozone reusing according to the present invention, an off-gas and an input water are contacted and preliminarily heated in a common boiler for collecting waste heat, and then the heat of the off-gas is removed. The pretreatment flotation tub 30 and the gas-liquid separation flotation tub 40 are used for preliminarily removing a floating substance and pollutant contained in the waste water based on the dissolved ozone/air flotation separation method by means of a unreacted ozone. To achieve the above objects, the pretreatment flotation tub 30 comprises a first pretreatment flotation tub 31 in which a unreacted ozone is processed via the dissolved ozone/air flotation process with respect to the waste water of the waste water storing tub 10 and is finally removed; and a second pretreatment flotation tub 32 in which the high pressure reaction substance of the discharge port 60b of the high pressure photo-oxidation reaction apparatus 60 is inputted into the second pretreatment flotation tub 32 having a waste water which was first treated based on the dissolved ozone/air flotation separation method in the first pretreatment flotation tub 31 via the feedback line 69 for thereby second performing the dissolved ozone/air flotation process. In the same method, in the gas-liquid separation flotation tub 40, a high pressure reaction substance is inputted into the low inlet 40a of the gas-liquid separation floatation tub 40 connected with the discharge port 60b of the high pressure photo-oxidation reaction apparatus 60, so that the dissolved ozone/air flotation process is performed with respect to the waste water treated via the above processes, and the unreacted ozone is reacted with the remaining pollutant in the treatment water for thereby being removed.

In a waste water treatment system and method using a high pressure advanced oxidation process with unreacted ozone reusing according to the present invention, the second pretreatment flotation tub 32 is connected with the feedback line 69 having the high pressure photo-oxidation decomposition apparatus discharge port 60b, the flow meter 69a and the flow rate adjusting valve 69b. Part or all of the high pressure reaction substance having the unreacted ozone is fed back into the low inlet 32c of the second pretreatment flotation tub 32 via the treatment water feedback line 69, and the unreacted ozone and pollutant are removed based on the dissolved ozone/air flotation separation method. The reaction substance of the high pressure photo-oxidation decomposition apparatus 60 is fed back into the lower side of the second pretreatment flotation tub 32 and the high pressure photo-oxidation reaction apparatus 60, so that it is possible to adjust the load level for thereby minimizing the impacts of the second pretreatment flotation tub 32 and the high pressure photo-oxidation reaction apparatus 80 based on the change of the concentration of the pollutant substance in the waste water inputted via the above system. In addition, it is possible to easily perform a first operation of the high pressure advanced oxidation process.

In a waste water treatment system and method using a high pressure advanced oxidation process with unreacted ozone reusing according to the present invention, the ozone inputted into the waste water treatment system 100 using a high pressure advanced oxidation process with unreacted ozone reusing is performed via the four steps, and almost ozone is reacted with the pollutant and is removed, and the finally remaining ozone is decomposed by means of the off-gas ozone removing apparatus 50 in compliance with the environment standard and is discharged into the air.

In a waste water treatment system and method using a high pressure advanced oxidation process with unreacted ozone reusing according to the present invention, the ozone supplied from the ozone generator 70 to the suction port 65a of the photo-oxidation pressurizing pump 65 and the twice treated waste water supplied via the lower discharge port 39 of the second pretreatment flotation tub 32 are pressurized with above three atmosphere, so that the waste water inputted into the inlet 60a of the high pressure photo-oxidation reaction apparatus 60 is used to decompose the pollutant based on the OH radical creation reaction via the photo-oxidation decomposition reaction of the ozone or is removed via the process in which the pollutant is decomposed based on the oxidation reaction of the dissolved ozone. Part of the high pressure reaction substance discharged via the discharge port 60b of the high pressure photo-oxidation reaction apparatus 60 is connected from the treatment water feedback line 69 to the lower input let 32c of the second pretreatment flotation tub 32. The circulation line 63 connected at the intermediate portion of the treatment water feedback line 69 is connected to the inlet 60a of the high pressure photo-oxidation reaction apparatus 60 via the circulation pump 63a, the flow meter 63b and the flow rate adjusting valve 63c, so that the high pressure reaction substance first reacted by means of the circulation pump 63a circulates via the high pressure photo-oxidation decomposition apparatus 60, whereby a series photo-oxidation decomposition reaction is repeatedly performed. So, the ozone is removed in the course of further performing the pollutant decomposition reaction in the first step. When treatment water containing a high pressure unreacted dissolved ozone via the discharge port 60b of the high pressure photo-oxidation reaction apparatus 60 is inputted into the lower input inlet 40a of the gas-liquid separation flotation unit 40 via the flow meter 64a and the flow rate adjusting valve 64b, the ozone is created in the form of a micro unreacted ozone foam and contacts with the waste water filled in the gas-liquid separation flotation tub 40 and floats upward and reacts with the remaining pollutant for thereby being removed based on the dissolved ozone/air flotation process in the second step. When the treatment water having a high pressure unreacted dissolved ozone via the discharge port 60b of the high pressure photo-oxidation reaction apparatus 60 is fed back to the lower input inlet 32c of the second pretreatment flotation tub 32 via the photo-oxidation feedback line 69 having the flow meter 69a and the flow rate adjusting valve 69b, micro ozone foams are floated, so that the pollutant contained in the first treated waste water and the unreacted ozone are removed based on the dissolved flotation process in the third step. The unreacted ozone collected at the upper side of the gas-liquid separation flotation tub 40 and supplied to the suction pot 35a of the pretreatment flotation tub pressurizing pump 35 via the unreacted ozone reusing line 45 and the unreacted ozone collected at the upper side of the second pretreatment flotation tub 32 and supplied to the suction port 35a of the pretreatment flotation tub pressurizing pump 35 via the pretreatment unreacted ozone reusing line 36 are pressurized with above three atmosphere along with the waste water supplied from the waste water storing tub 10 for thereby dissolving the ozone and are inputted into the lower input inlet 31a of the first pretreatment flotation tub 31, so that the dissolved flotation process is performed for thereby removing the ozone in the fourth step.

In a waste water treatment system and method using a high pressure advanced oxidation process with unreacted ozone reusing according to the present invention, the ozone that the high pressure photo-oxidation reaction apparatus 60 received from the ozone generator 70 and the waste water which was twice treated by the first and second pretreatment flotation tubs 30a and 30b are pressurized so that the amount of the ozone, which is inputted into the photo-oxidation pressurizing pump 65, is present in the foam state, is minimized, and the pressure and flow rate of the high pressure photo-oxidation reaction apparatus 60 are adjusted in such a manner that the revolution of the photo-oxidation pressurizing pump 65 is adjusted based on the flow rate determined by means of the pressure meter 64b, the flow rate meter 64a and the flow rate adjusting valve 64c. According to the feedback system, part or all of the treatment water is fed back to the second pretreatment flotation tub 32 via the feedback line 69 connected with the discharge port 60b of the high pressure photo-oxidation reaction apparatus 60 in consideration with the load level of the high pressure photo-oxidation reaction apparatus 60 and the operation efficiency of the pretreatment flotation tub 30. The lower inlet 60a of the photo-oxidation reaction apparatus 60 is connected with the treatment water feedback line 69 connected with the discharge port 60b of the high pressure photo-oxidation reaction apparatus 60 via the photo-oxidation circulation pump 63, the flow meter 63b, and the flow rate adjusting valve 63c, so that part or all of the high pressure reaction substance is circulated for thereby adjusting the photo-oxidation reaction level and the amount of the unreacted ozone, whereby the high pressure photo-oxidation reaction is performed.

In a waste water treatment system and method using a high pressure advanced oxidation process with unreacted ozone reusing according to the present invention, the photocatalyst coating supporter 67 filled in the high pressure photo-oxidation reaction apparatus 60 is made in a coil spring shape. Here, the diameter of the wire is 0.1~0.5 mm, and the material is a metallic material such as stainless steel, titanium, aluminum, etc. The diameter of the coil spring 67a is 5~70 mm, and the shape of the coil spring 67a is a hourglass shape. The pitch of the coil spring 67a is smaller than the diameter of the wire 67b, and the pitches of the beginning and ending potions of the spring are near the neighboring pitches, so that the photocatalyst coating supporters 67 of the coil spring 67a are not overlapped on the course of filling into the high pressure photo-oxidation reaction apparatus 60 for thereby intensifying the filling. The wire surfaces 67c may be sand-processed using diamond sand and may be corroded using a chemical such as acid, so that the wire surfaces 67 have protrusions for thereby enhancing an attaching power of the photocatalyst. The surface area of the coated photocatalyst can be enlarged.

In a waste water treatment system and method using a high pressure advanced oxidation process with unreacted ozone reusing according to the present invention, the photocatalyst coating supporter 67 is made in a coil spring shape by winding the wire 67b, and the wire surface 67c is toughly processed for thereby increasing the surface area of the same, and titanium alkoxide is diluted in solvent and is coated. It is heat-treated at below 800° C. In the photocatalyst coating supporter 67 made by stably coating the photocatalyst 67d on the wire surface 67c, ultraviolet rays are properly scanned into the space between the wires 67d of the coil spring 67a, namely, between the pitches and between the supporters 67a, so that ultraviolet ray can reach at the photocatalyst 67d which is relatively far from the crystal tube 61 having the ultraviolet lamp 62, so that the waste water having pollutants can easily pass for thereby decreasing the pressure loss. In this case, it is possible to obtain a much wider surface area and a less pressure loss as compared to when coating the photocatalyst on the porous plate. So, when the waste water is processed, the decomposition efficiency is high, and the treatment capacity can be increased.

In a waste water treatment system and method using a high pressure advanced oxidation process with unreacted ozone reusing according to the present invention, when the photocatalyst coating supporter 67 in the type of the coil spring 67a is filled into the high pressure photo-oxidation reaction apparatus, the photocatalyst coating supporter 67 of the coil spring 67a is compressed using an elastic force of the spring supporter and is filled. So, a lot of spaces is formed between the crystal tubes 61 used for protecting the metallic photocatalyst coating supporters 67 and the ultraviolet ray lamp 62, so that the photocatalyst coating supporters 67 may move based on the flow of water and may collide with each other for thereby damaging the crystal tube 61. However, in the present invention, the photocatalyst coating supporters 67 are stably fixed with each other by means of the tensional force of the coil spring 67a and do not move by means of the flow of water, so that it is possible to prevent the crystal tubes 61 from being broken.

In a waste water treatment system and method using a high pressure advanced oxidation process with unreacted ozone reusing according to the present invention, the ultraviolet ray discharged from the ultraviolet lamp 62 may be classified into a vacuum UV which creates ozone in reaction with oxygen based on wavelengths, a UV-C 200~280 nm which has sanitization and decomposes ozone, and a UV-A,B 280~400 nm which is generally used for a photocatalyst reaction. When the UV-C 200~280 nm is passed through the dissolved ozone, the ozone absorbs the ultraviolet ray and photo-decomposes the same for thereby creating $H_2O_2$ as an intermediate substance. The pollutant is decomposed by means of an OH radical which is created as $H_2O_2$ is decomposed.

In a waste water treatment system and method using a high pressure advanced oxidation process with unreacted ozone reusing according to the present invention, the ultraviolet ray used in reaction for creating OH radical by decomposing the ozone in the advanced oxidation process in the photocatalyst reaction which uses ultraviolet ray may use a low pressure or high pressure Ag ultraviolet ray lamp which emits 254 nm wavelengths which is able to decompose ozone, and an intermediate pressure lamp which emits ultraviolet ray of various wavelengths from UV-C to UV-A. Here, the 254 nm ultraviolet ray having a short wavelength has just 2~3 nm of underwater penetration power. So, only ozone near the crystal tube 61 having the ultraviolet ray lamp 62 reacts. The holes are formed near the crystal tube having the ultraviolet ray lamp in the photo-oxidation reaction apparatus of the Korean patent registration number 0541573 so that ozone foams can pass, so that the ozone is decomposed by means of ultraviolet ray while ozone passes through near the ultraviolet ray lamp, and the creation amount of OH radical increases for thereby enhancing the decomposition reaction efficiency of the pollutant.

In a waste water treatment system and method using a high pressure advanced oxidation process with unreacted ozone reusing according to the present invention, the ultraviolet ray lamp 62 used in the high pressure advanced oxidation process formed of the high pressure photo-oxidation reaction apparatus 60 filled with the photocatalyst coating supporter 67 uses an intermediate pressure ultraviolet ray lamp which emits various wavelengths lights from ultraviolet ray to visible ray, the OH radical is created based on the photo-oxidation decomposition reaction by means of the UV-C 254 nm wavelength ultraviolet ray having a weak transitivity near the crystal tube 61. The photocatalyst coating supporter 67 positioned relatively far from the crystal tube 61 may be used for decomposing the pollutant by creating OH radical as the ozone is decomposed based on the photo-oxidation reaction by means of the UV-A and B 280~400 nm which may reach far since it has a relatively better penetration power with its longer wavelength as compared to the UV-C. The reaction that the OH radical created based on the pollutant oxidation reaction by means of the increased dissolved ozone, the decomposition reaction of the ozone by means of the ultraviolet ray, and the ozone decomposition reaction by means of the ultraviolet ray and the photocatalyst decomposes the pollutants and the reaction that the OH radical created as the ultraviolet ray and the photocatalyst decompose water decomposes the pollutants are concurrently performed, so that it is possible to significantly increase the decomposition speed of the pollutants. In particular, it is possible to maximize the undecomposable substances.

In the above, the waste water treatment system and method using a high pressure advanced oxidation process with unreacted ozone reusing according to the present invention were described just as an illustrative purpose for implementing the present invention. It is not limited to the technical scope of the present invention. The protection scope of the present invention may be defined by means of the claims. Those who skilled in the art may modify or change without escaping from the gist of the present invention, and such medication and change may be also included in the scope of the present invention.

Advantageous Effects

In the waste water treatment system and method using a high pressure advanced oxidation process with unreacted ozone reusing according to the present invention, the ozone being present in the foams due to a low underwater dissolubility in a conventional normal pressure advanced oxidation process has a low contact efficiency with the pollutant, so that there is a lot of unreacted ozone. However, in the present invention, the advanced oxidation process, which has been conducted at a normal pressure in the conventional art, is changed to a high pressure environment for thereby dissolving a lot of ozone, so that it is possible to enhance a contact efficiency of the ozone with the pollutant. As the creation of the OH radical having a strong oxidation power by means of the photo-oxidation reaction of the ultraviolet ray and ozone increases, the pollutant decomposition speed increases. In addition, the unreacted ozone, which was directly discharged into the air in the conventional art, is treated along with the floatation and removal method of the floated substances in the waste water based on the dissolved ozone/air flotation separation method in the pretreatment flotation tub and the gas-liquid separation flotation tub. The efficiency of the use of the ozone increases by reusing the unreacted ozone which allows the pollutant to be removed, so that it is possible to decrease the capacity of the advanced oxidation process waste treatment apparatus and the capacity of the expensive ozone generator, whereby the installation cost and the operation cost can be significantly decreased, and the waste water treatment apparatus of the advanced oxidation process can be made in a compact size.

In addition, in a waste water treatment system and method using a high pressure advanced oxidation process with unreacted ozone reusing according to the present invention, the ozone inputted into the high pressure advanced oxidation process waste water treatment system is treated via four reaction steps for thereby increasing an efficiency of the decomposition reaction of the ozone, so that it is possible to minimize the amount of unreacted ozone, and it is possible to perform a desired reaction only with the ozone needed for the pollutant decomposition reaction. The capacity of the expensive ozone generator can be reduced as compared to the conventional advanced oxidation process which uses a large capacity ozone generator in which almost ozone is discharged into the air. In addition, it is possible to decrease the load of the off-gas ozone removing apparatus for removing the off-gas ozone which is discharged into the air.

BEST MODE

In the present invention, there is provided a waste water treatment system using a high pressure advanced oxidation process by using a unreacted ozone which comprises a high pressure photo-oxidation reaction apparatus which includes a housing having an inlet for receiving an ozone-dissolved source water and a discharge port for discharging the inputted source water, an ultraviolet lamp which is installed in the interior of the housing for irradiating ultraviolet ray to the source water inputted into the interior of the housing, and a photocatalyst coated supporter which is filled into the interior of the housing; a pressurizing pump which pumps the source water into the inlet of the housing of the high pressure photo-oxidation reaction apparatus; an ozone generator of which ozone supply line is connected with a source water line connected with a suction port of the photo-oxidation pressurizing pump for thereby generating ozone, so that the generated ozone is spread into the source water which is inputted via the suction port of the photo-oxidation pressurizing pump; and a gas-liquid separation flotation tub which has a scum removing port for discharging floated substances which are floated in an absorbed state to a micro foam ozone generated from the ozone dissolved in the treatment water inputted into the interior of the reaction tub, with an inlet port of the same being provided at a lower side of the reaction tub so that the treatment water discharged from the discharge port of the housing of the high pressure photo-oxidation reaction apparatus is inputted into the interior of the reaction tub which is open so that a normal pressure is formed in the interior of the same, with a discharge port being provided at the reaction tub for ensuring that the treatment water inputted into the interior of the reaction tub is discharged.

Mode for Invention

The waste water treatment system and method using a high pressure advanced oxidation process with unreacted ozone reusing according to the present invention will be described in more detail with reference to the accompanying drawings.

Figure 1:
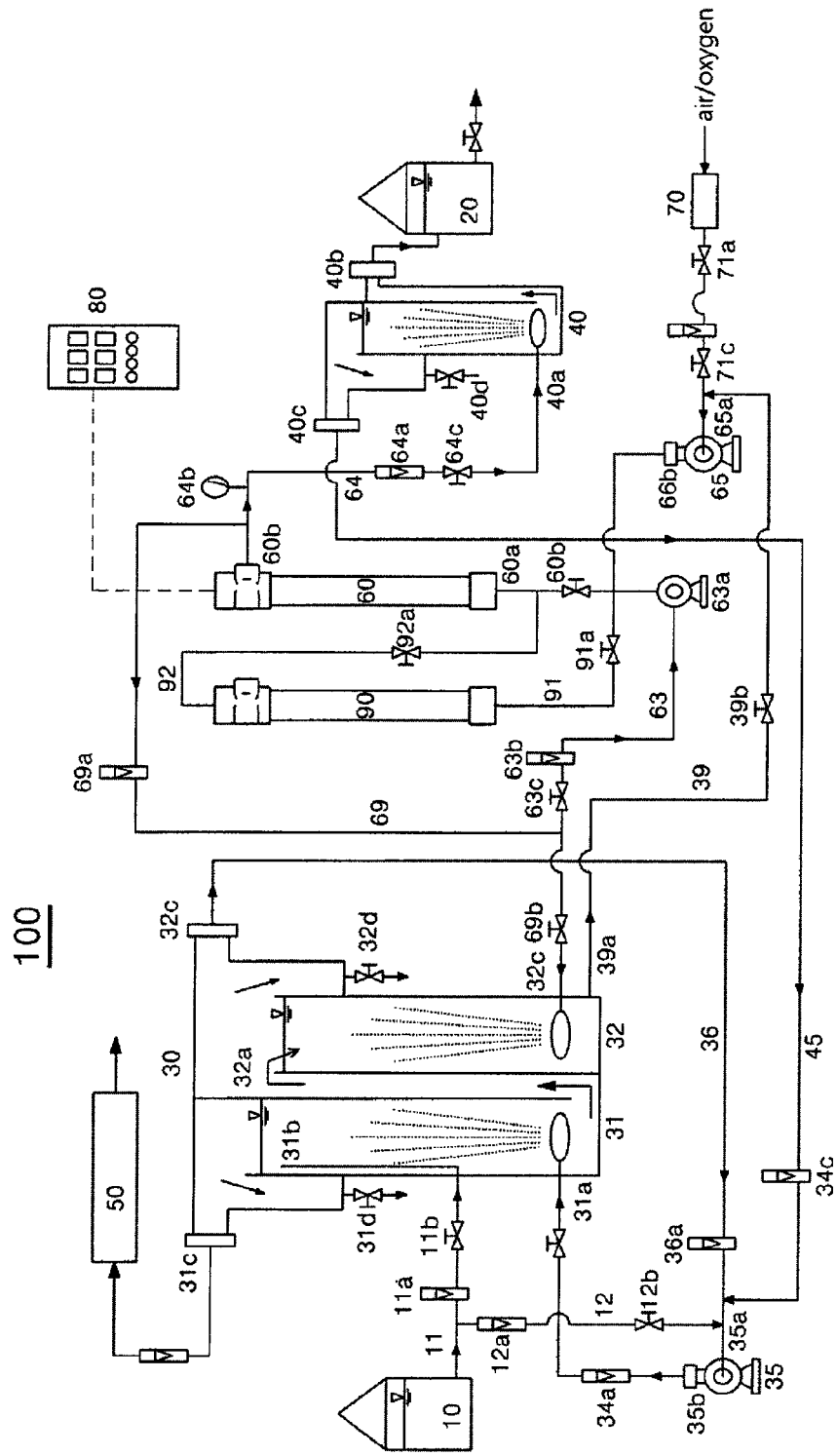
FIG. 1 is a schematic view illustrating a waste water treatment system used in a waste water treatment method using a high pressure advanced oxidation process with unreacted ozone reusing according to the present invention.
Figure 2:
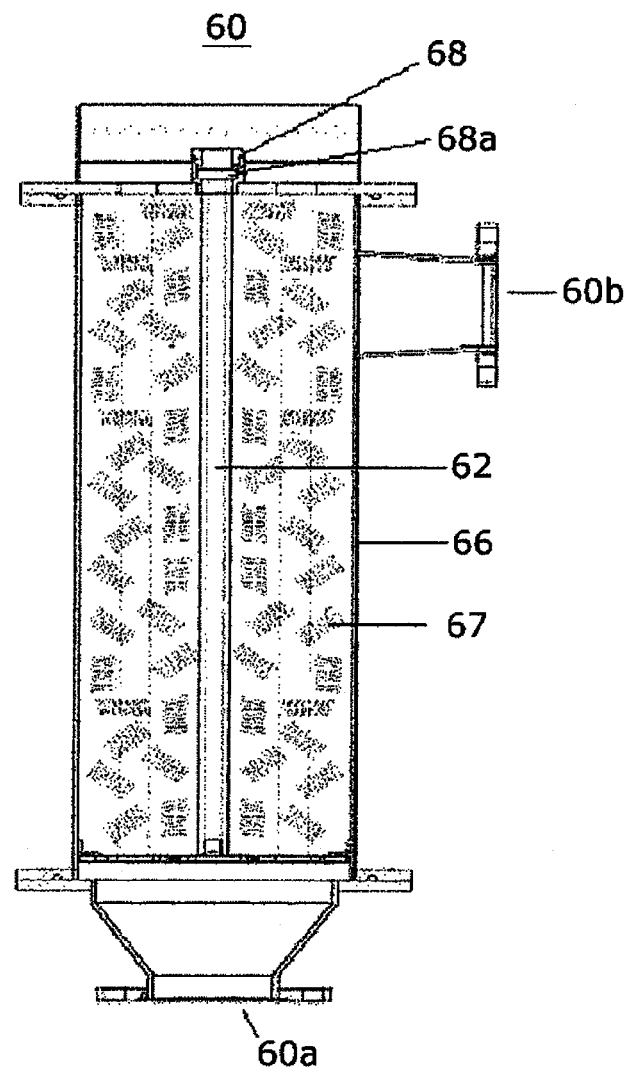
FIG. 2 is a view illustrating a high pressure photo-oxidation reaction apparatus used in a waste water treatment method using a high pressure advanced oxidation process with unreacted ozone reusing according to the present invention.
Figure 3:
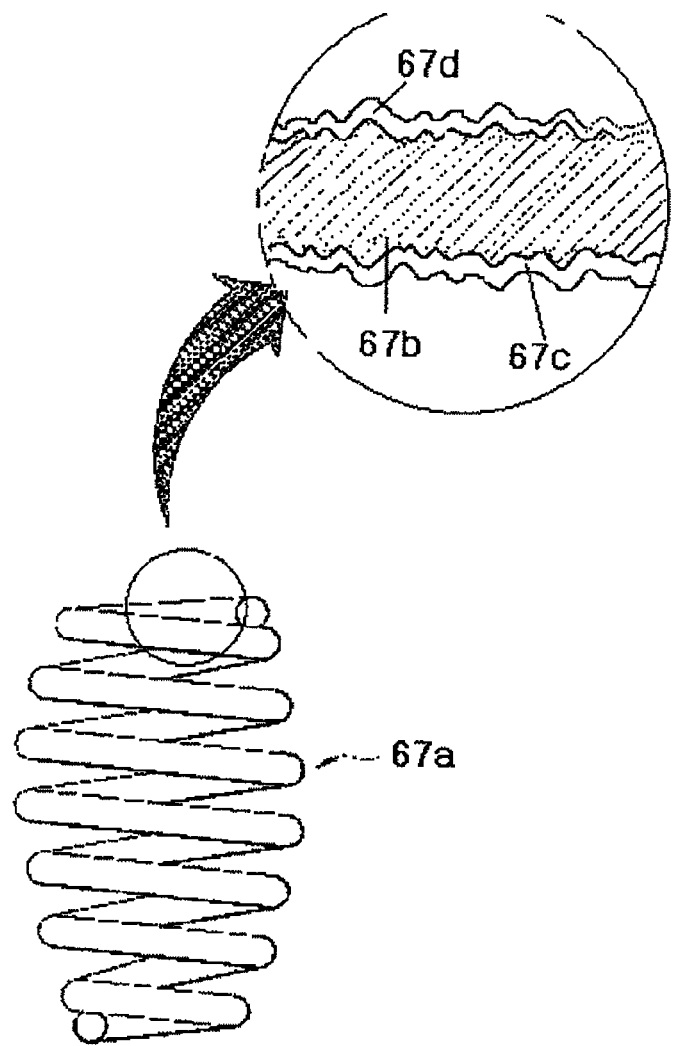
FIG. 3 is a view illustrating a coil spring type supporter coated with a photocatalyst, a photocatalyst coated on a coil spring surface and a wire surface according to the present invention.
Figure 4:
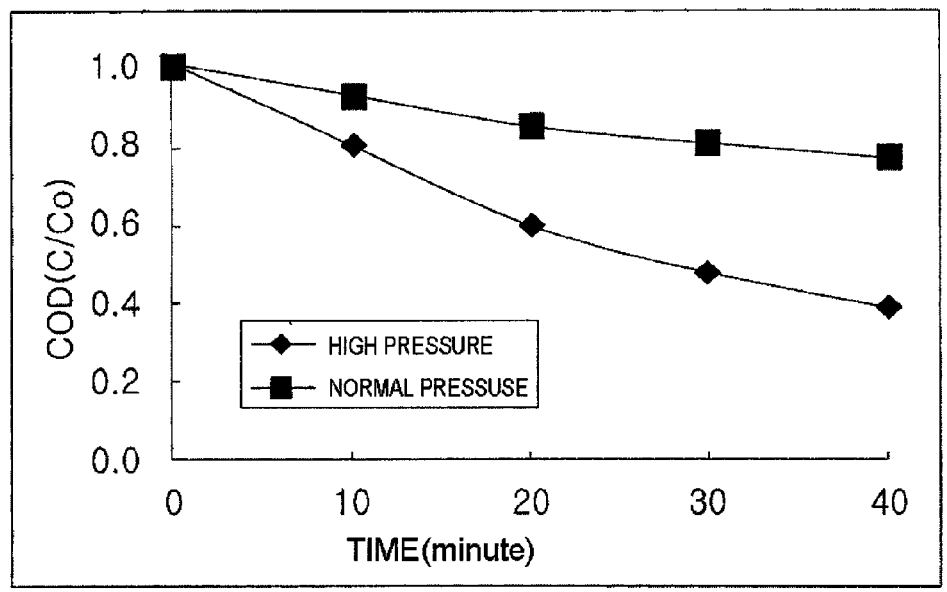
FIG. 4 is a comparison graph of a salt-pickled cabbage salt water COD decomposition ratio based on a high pressure advanced oxidation reaction and a normal pressure advanced oxidation reaction according to the present invention.
Figure 5:
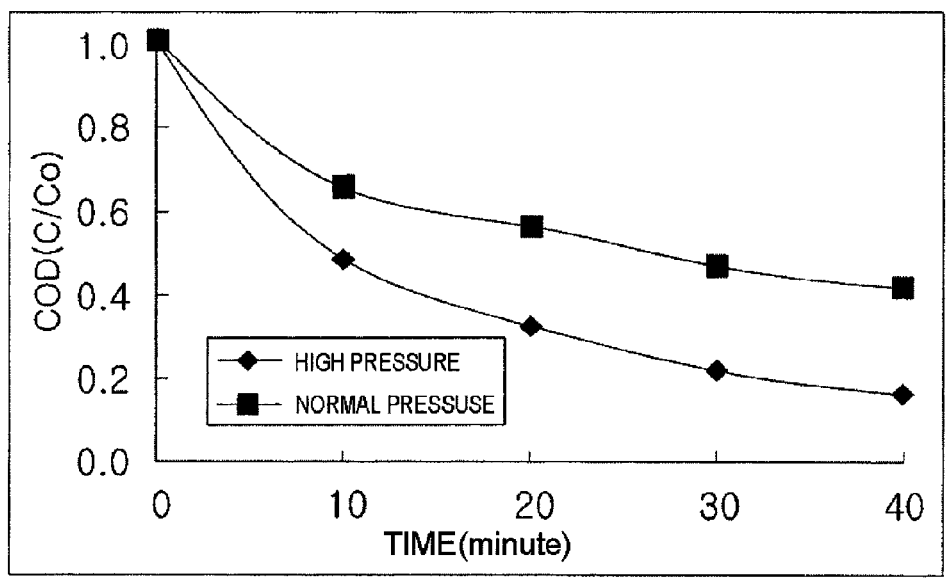
FIG. 5 is a comparison graph of a salt-pickled cabbage salt water turbidity removal ratio based on a high pressure advanced oxidation reaction and a normal pressure advanced oxidation reaction according to the present invention.

FIG. 1 is a schematic view illustrating a waste water treatment system used in a waste water treatment method using a high pressure advanced oxidation process with unreacted ozone reusing according to the present invention. FIG. 2 is a view illustrating a high pressure photo-oxidation reaction apparatus used in a waste water treatment method using a high pressure advanced oxidation process with unreacted ozone reusing according to the present invention. FIG. 3 is a view illustrating a coil spring type supporter coated with a photocatalyst, a photocatalyst coated on a coil spring surface and a wire surface according to the present invention. FIG. 4 is a comparison graph of a salt-pickled cabbage salt water COD decomposition ratio based on a high pressure advanced oxidation reaction and a normal pressure advanced oxidation reaction according to the present invention. FIG. 5 is a comparison graph of a salt-pickled cabbage salt water turbidity removal ratio based on a high pressure advanced oxidation reaction and a normal pressure advanced oxidation reaction according to the present invention.

As shown in the drawings, a waste water treatment system 100 using a high pressure oxidation process having a unreacted ozone reuse process according to an embodiment of the present invention comprises a waste water storing tub 10 for storing waste water, and a pretreatment flotation tub 30 which removes floating substances and pollutant in waste water with the unreacted ozone. Here, the pretreatment flotation tub 30 includes first and second pretreatment floatation tubs 30a and 30b. The waste water treated in the pretreatment floatation tub 30 is transferred to the high pressure photo-oxidation reaction apparatus 60 which decomposes the pollutants based on the photo-oxidation reaction by pressurizing along with the ozone supplied from the ozone generator 70 using the pressurizing pump 65. There is provided a feedback line 69 which feeds back part of a high pressure reaction substance of the high pressure photo-oxidation reaction apparatus 60 to the second pretreatment flotation tub 32. A treatment water circulation line 63 is connected at an intermediate portion of the feedback line 69 with a circulation pump 63a for circulating a high pressure reaction substance to the high pressure photo-oxidation apparatus 60, a flow meter 63b and a flow rate adjusting valve 63 being installed at the treatment water circulation line 63. In addition, there is provided a gas-liquid separation flotation tub 40 which removes the pressure of the high pressure reaction substance of the high pressure photo-oxidation reaction apparatus 60 and removes the remaining pollutants in the treatment water based on the dissolved ozone/air flotation separation method. The unreacted ozone collected at the upper side of the gas-liquid separation flotation tub 40 is transferred to the pretreatment flotation tub pressurizing pump 35 along with the waste water and is inputted into the first pretreatment flotation tub 31 for thereby finally removing the unreacted ozone based on the dissolved ozone/air flotation separation method. The unreacted ozone is removed below the environment standard value by transferring the same to the off-gas ozone removing apparatus 50 via the flotation tub discharge port 31c of the first pretreatment flotation tub 31 before discharging the same into the air.

The advanced oxidation process waste water treatment apparatus 100 using the high pressure photo-oxidation decomposition reaction apparatus 60 according to the present invention is implemented via a first step unreacted ozone reuse process of the second pretreatment flotation tub 32 and the gas-liquid separation flotation tub 40, in which the waste water first treated with the ozone is pressurized with a high pressure using the pressurizing pump 65 in the process which uses a unreacted ozone and is decomposed by means of the photo-oxidation reaction in the high pressure photo-oxidation decomposition apparatus 60, and the floating substances among the waste water are floated based on the dissolved ozone/air flotation separation method with respect to the unreacted ozone contained in the high pressure reaction substance and are reacted with the pollutant and are removed, and a second step unreacted ozone reuse process of the first pretreatment flotation tub 31 in which the waste water of the waste water storing tub 10 and the unreacted ozone collected at the upper sides of the second pretreatment flotation tub 32 and the gas-liquid separation flotation tub 40 are pressurized along with the flotation tub pressurizing pump 35 for thereby removing the floating substances and pollutant contained in the waste water based on the dissolved ozone/air flotation separation method. In the process for reusing the first and second step unreacted ozone, there are provided a scum removing apparatus (not shown) which removes the foams at the upper sides of the pretreatment flotation tubs 31 and 32 and the gas-liquid separation flotation tub 40, and scum treatment tubs 31d, 32d and 40d which store and discharge the removed scum.

The high pressure photo-oxidation reaction apparatus 60 pressurizes the ozone supplied from the ozone generator 70 and the waste water twice treated by the first and second pretreatment flotation tubs 30a and 30b with a certain pressure so that the amount of the foam ozone inputted into the photo-oxidation pressurizing pump 65 is minimized. The pressure and flow rate of the high pressure photo-oxidation reaction apparatus 60 are preferably adjusted by means of a method for adjusting the revolution of the pressurizing pump 65 at the flow rate set by the pressure meter 64b, the flow meter 64a and the flow rate adjusting valve 64c. In a feedback system, part of all of the treatment water is fed back to the second pretreatment flotation tub 32 via the feedback line 69 connected with the discharge port 60b of the high pressure photo-oxidation reaction apparatus 60 in consideration with the load adjusting of the high pressure photo-oxidation reaction apparatus 60 and the operation efficiency of the pretreatment floatation tub 30. In addition, the lower inlet 60a of the photo-oxidation reaction apparatus 60 is connected with the treatment water feedback line 69 connected with the discharge port 60b of the high pressure photo-oxidation reaction apparatus 60 via the circulation line 63a having the photo-oxidation circulation pump 63, the flow meter 63b, and the flow rate adjusting valve 63c. so, it is possible to perform the high pressure photo-oxidation reaction while adjusting the photo-oxidation reaction level and the amount of the unreacted ozone by circulating part or all of the high pressure reaction substance.

The high pressure photo-oxidation reaction apparatus 60, which performs a photo-oxidation decomposition reaction with a high pressure, is formed of a tube shaped housing 66 having a rectangular or circular cross section. Here, the housing 66 is made of stainless steel or titanium and comprises a lower inlet 60a connected with the photo-oxidation pressurizing pump 65, an upper discharge port 60b which is connected with the treatment water feedback line 69 and the gas-liquid separation flotation tub 40, and a crystal tube fixing unit 68 which accommodates the ultraviolet lamp 62 at the upper side of the housing 66 and fixes the U-shaped crystal tube 61. In the housing 61, at least one crystal tube 61 is installed in the longitudinal direction of the housing 61. The photocatalyst coated supporter 67 may be filled in the inner space of the crystal tube 61 and the housing 66.

The reaction with respect to the ozone in the high pressure photo-oxidation reaction apparatus 60 may be classified into four steps. Namely, 1) the ozone is directly reacted with the pollutant, 2) the ozone absorbs the light of wavelength of 254 nm and creates OH radical and reacts with the pollutant, 3) the ozone is decomposed by means of the ultraviolet ray and the photocatalyst reaction and creates OH radical and reacts with the pollutant, and 4) as the ultraviolet ray reacts with the photocatalyst, and water is decomposed, and OH radical is created and reacted with pollutant. The above four steps may be concurrently performed. The ultraviolet ray used in the second, third and fourth reactions may use low pressure and high pressure Ag lamps which selectively irradiate wavelengths of 254 nm. In the third and fourth photocatalyst reactions, an intermediate pressure Ag lamp having a wider width of ultraviolet ray emission is preferred since the 254 nm ultraviolet ray of a shorter wavelength has a penetration power of a few nm. So as to increase the penetration power, a high output lamp is disadvantageously needed. Since only the portions near the crystal tube 61, which protects the ultraviolet lamp 62, can be used for reaction, more ultraviolet lamps are needed and the arrangement of the ultraviolet lamps should be disadvantageously intensified.

The ultraviolet lamp 62 may be formed of a low pressure or high pressure Ag ultraviolet ray lamp which irradiates a UV-C 254 wavelength or an intermediate pressure ultraviolet ray lamp which irradiates ultraviolet ray of UV-A, B and C. A stabilizer system is installed for flashing the ultraviolet ray lamp 62 with a single output and is able to adjust the output of the ultraviolet ray lamp 62 with 5~12%.

Among the pollutants, a certain pollutant may be sanitized only with a reaction by ozone under a condition that does not need ultraviolet ray and photocatalyst. In the present invention, the source water pressurized by the photo-oxidation pressurizing pump 65 is not directly inputted into the high pressure photo-oxidation reaction apparatus 60, but is passed via the high pressure ozone reaction apparatus 90 and is inputted into the high pressure photo-oxidation reaction apparatus 60. Since the source, water which was previously ozone-reacted before the photo-oxidation reaction, is processed via the photo-oxidation reaction by the high pressure photo-oxidation reaction apparatus 60, so that it is possible to decrease any load of the ozone reaction in the high pressure photo-oxidation reaction apparatus 60. As shown in the drawings, an opening and closing valve 60b provided at the pipe extended to the lower inlet 60a of the high pressure photo-oxidation reaction apparatus 60 is closed, and the opening and closing valve 91a provided at the pipe 91 extended from the photo-oxidation pressurizing pump 65 to the high pressure ozone reaction apparatus 90 is opened, the source water pressurized by means of the photo-oxidation pressurizing pump 65 is inputted into the high pressure ozone reaction apparatus 90 and is inputted into the high pressure photo-oxidation reaction apparatus 60 via the pipe 92 connected with the lower inlet 60a of the high pressure photo-oxidation reaction apparatus 60. The pipe 92 connected with the lower inlet 60a of the high pressure photo-oxidation reaction apparatus is closed by means of the opening and closing valve 92a of the pipe 92.

The lower inlet 60a of the photo-oxidation reaction apparatus 60 is connected with the treatment water feedback line 69, which transfers a high pressure substance to the second pretreatment tub via the upper discharge port 60b of the high pressure photo-oxidation reaction apparatus 60, via the circulation line 63 which has the flow meter 63b, the flow rate adjusting valve 69c, and the circulation pump 63a. The efficiency of the photo-oxidation decomposition reaction of the waste water can be adjusted based on the method for circulating part or all of the treatment water fed back via the treatment water feedback line 69 to the high pressure photo-oxidation reaction apparatus.

The lower discharge port 39b of the second pretreatment flotation tub 32 is connected with the photo-oxidation pressurizing pump 65 via the photo-oxidation waste water supply tube 39 having the flow rate adjusting valve 39b, and the photo-oxidation waste water supply tube 39 is connected with the ozone generator 70 via the ozone supply line 71 having a check valve 71c, a flow meter 71b, and a flow rate adjusting valve 71a. Here, the photo-oxidation pressurizing pump 65 pressurizes waste water and ozone at above three atmosphere and supplies the ozone dissolved waste water to the high pressure photo-oxidation reaction apparatus 60. In the high pressure photo-oxidation reaction apparatus 60, the housing 66 having a circular or rectangular cross section has an inlet 60a and an output 69b. A crystal tube fixing unit 68 is provided at an upper side of the housing 66 for fixing a U-shaped crystal tube 61 having one closed end for thereby accommodating the ultraviolet ray lamp 62. The crystal tube fixing unit 68 fixes an open outer diameter portion of the U-shaped crystal tube 61 for sealing with respect to the high pressure photo-oxidation reaction apparatus 60. Namely, it is sealed using a fluorine resin or silicon O-ring or gasket which is not aged with respect to irradiation of the ultraviolet ray with respect to an inner wall of the crystal tube fixing unit 68. The crystal tube 61 is installed at the center of the high pressure photo-oxidation reaction apparatus in a longitudinal direction of the same. Here, the crystal tube 61 preferably has a thickness of over 2 mm so as to endure a high pressure photo-oxidation reaction pressure. When at least one crystal tube 61 is installed, the crystal tubes should be installed at regular intervals in the high pressure photo-oxidation reaction apparatus 60, so that uniform irradiation amount of ultraviolet ray is outputted. The photocatalyst coating supporter 67 is filled between the outer wall of the crystal tube 61 and the high pressure photo-oxidation reaction apparatus 60.

In the present invention, there is provided a treatment water feedback line 69 for feeding back a high pressure reaction substance of the discharge port 60b of the high pressure photo-oxidation reaction apparatus 60 to the lower input port 32c of the second pretreatment floatation tub 32 so as to adjust a pollutant substance load adjusting level of the high pressure photo-oxidation reaction apparatus 60 and a reaction time of the waste water of the high pressure photo-oxidation reaction apparatus 60. In addition, a treatment water circulation line 63 is installed for circulating a high pressure reaction substance from the intermediate portion of the treatment water feedback line 69 to the lower inlet port 60a of the high pressure photo-oxidation reaction apparatus 60. Flow meters 63b and 69a and flow rate adjusting valves 63c and 69b are installed at the treatment water feedback line 69 and the circulation line 63. A high pressure reaction substance is inputted into the second pretreatment floatation tub 32 by its pressure, and the circulation to the lower inlet port 60a of the high pressure photo-oxidation reaction apparatus 60 is performed by means of the circulation pump 63a.

In the present invention, the high pressure reaction substance reacted in the first high pressure photo-oxidation reaction apparatus 60 is transferred by means of the pretreatment floatation and gas-liquid separation floatation tub, and the floating substance and pollutant are removed by means of the dissolved ozone/air floatation method, and the pollutant contained in the waste water inputted into the high pressure photo-oxidation reaction apparatus 60 is previously removed. Since it is possible to adjust the pollutant decomposition efficiency by adjusting the staying time of the waste water of the photo-oxidation decomposition apparatus 60 as the high pressure reaction substance is circulated toward the photo-oxidation decomposition apparatus 60. So, it is advantageously operate the high pressure advanced oxidation process waste water treatment apparatus 100 using the high pressure photo-oxidation reaction apparatus 60 with respect to the changes in pollutant concentration and treatment amount of the waste water.

In the present invention, in the step for removing a unreacted ozone in the gas-liquid separation flotation tub 40, a high pressure reaction substance discharged via the discharge port 60b of the high pressure photo-oxidation reaction apparatus 60 is discharged to the lower inlet port 40a of the gas-liquid separation floatation tub 40. Micro size unreacted ozone foams created as the solubility sharply decreases due to the pressure difference are floated toward the upper side of the treatment water in the gas-liquid separation floatation tub 40 and react with the remaining pollutants, so that the pollutants and unreacted ozone are removed based on the dissolved ozone/air flotation process. The unreacted ozone remaining after the dissolved ozone/air flotation process are collected at the upper side of the gas-liquid separation flotation tub 40 and are transferred to the flotation tub pressurizing pump 35 and are processed via the dissolved ozone/air flotation process in the first pretreatment flotation tub 31. So, the unreacted ozone is minimized, and is transferred to the off-gas ozone removing apparatus and is discharged into the air at a proper concentration in compliance with the environment standard.

A small amount of ozone may be present in the discharged off-gas after the pretreatment process. Since the ozone of the stratosphere absorbs harmful ultraviolet ray, the ozone near the ground may cause a breathing related disease and allows a photo chemical smog to increase based on a reaction with the VOC and Nox. According to the OSHA (Occupational Safety and Health Administration), the permissible exposing degree for 8 hours is about 0.1 ppm. The ozone in a range of 0.1~1 ppm may cause headache, throat dryness and may affect mucous membrane.

In the off-gas ozone removing apparatus 50 for removing a small amount of ozone contained in the discharged off-gas, one among photocatalyst-coated active charcoal, metallic net, metallic coil spring, etc. is filled near the ultraviolet lamp installed at the stainless steel tube through which the unreacted ozone passes, and the ultraviolet ray is irradiated onto the photocatalyst, so that the unreacted ozone is decomposed by means of the photo-oxidation decomposition reaction. The hollow cylindrical crystal or stainless steel tube having a diameter of 5~20 mm, a length of 5~30 mm, and a thickness of 1~3 mm is filled into the interior of the tube of the crystal or stainless steel through which the unreacted ozone passes. The mesh processed with a stainless steel having a diameter of below 2 mm is stacked and filled. They are heat-decomposed at a temperature of about 200° C. by means of a heating wire of which temperature can be controlled.

In the present invention, the floatation tub pressurizing pump 35 and the high pressure photo-oxidation pressurizing pump 65 used for mixing and dissolving unreacted ozone in the waste water may use a DAF pump or does not use a method for inputting ozone by pressurizing the compressed waste water using a compressor. Namely, it is preferably pressurized along with the waste water using a common pressurizing pump such as a horizontal or multi-step pump, a gear pump, a piston pump, a loader pump, a procon pump, etc. The dissolving degree of ozone can be controlled by means of the amount of inputted ozone and the pressure. It is possible to easily check the change of the amount of foams in the waste water via a vie window of the surface area based flow meter as the solubility of the ozone increases when the reaction pressure is increased.

In the present invention, in the ozone inputted into the high pressure photo-oxidation reaction apparatus 60, as the solubility of the ozone increases, the amount of the ozone of the foam shape decreases, so that a needed ultraviolet ray irradiation is smoothly performed. So, the photocatalyst and photo-oxidation decomposition reaction of ozone are actively performed, so that the amount of the creation of the OH radical increases. The photocatalyst coated supporter 67 filled in the inner space of the photo-oxidation reaction apparatus 60 is a coil spring type 67a of the supporter 67. The ultraviolet ray can be easily irradiated through the spaces between the pitches and the water containing pollutant can easily flow between the same, so that the pressure loss is minimized, and when the supporter 67 of the coil spring 67a is filled in the high pressure photo-oxidation reaction apparatus 60, and the supporter 67 of the coil spring 67a is compressed and filled, they can be stable filled by means of the tensional force of the spring of the filled photocatalyst coated supporter 67, so that it is possible to prevent the crystal tube 61 from being damaged by the flow of the filled supporters by means of the flow resistance of the water. So, the coil spring type supporters having elastic forces are preferred.

In the present invention, the supporter of the coil spring 67a is made of a wire having a diameter of 0.1~5 mm, and the diameter of the coil spring 67a is 5~7 mm, and the pitch of the same is smaller than the diameter of the wire 67b, so that it is preferred to prevent the coil spring 67a from being inserted into each other in the course of the filling into the high pressure photo-oxidation reaction apparatus 60 and to prevent the filling rate from being low.

Namely, when the stainless steel or titanium wire having a diameter of 0.1~5 mm is made in a coil spring shape 67a of the photocatalyst coated supporter 67, the coil spring 67a is made in a hourglass shape. The pitch of the spring is smaller than the diameter of the wire 67b. The pitch of the beginning and ending portions of the spring are near the neighboring pitch, so that the supporters of the coil springs 67a are not overlapped in the course of filling. The wire surfaces 67 are made tough by colliding sand or diamond sand to the wire 67b along with high pressure air in the sanding process. The titanium alkoxide may be coated and heat-treated under a temperature of 800° C.

In the high pressure advanced oxidation process waste water treatment system 100 which reuses unreacted ozone according to the present invention, the pollutant contained in waste water is decomposed by means of a lot of dissolved ozone, and the dissolved ozone reacts with the pollutant based on the OH radical having a strong oxidation power created by means of the photo-oxidation reaction of the ultraviolet ray and the photocatalyst 67*d* and is decomposed, so that a high reaction efficiency can be obtained.

In the present invention, the ultraviolet lamps 62 may be installed in multiple numbers depending on the treatment capacity of the high pressure photo-oxidation reaction apparatus 60. The ultraviolet lamps 62 are protected in the crystal tube 61 so as to avoid a direct contact with the waste water and are arranged longitudinally in the up and down directions in the interior of the high pressure photo-oxidation reaction apparatus 60. Here, the ultraviolet ray lamp 62 is electrically connected with the power supply panel unit 80 which supplies power, and the stabilizer system, which drives the ultraviolet lamp 62, is provided with a certain unit for viewing the operation state from the outside. It is preferred to adjust the output of the ultraviolet lamp up to 5~120% variably based on the treatment level of the waste water. The stabilizer system may be adapted and turned on and off so that the ultraviolet lamp 62 may be turned on with a single output or the output of the same can be variably adjusted within 5~120%. Here, the ultraviolet lamp 62 is a low or high pressure Ag ultraviolet lamp which emits UV-C 254 nm wavelength or an intermediate pressure ultraviolet lamp which emits UV-A, B, C wavelengths.

At the rear ends of the first pretreatment flotation tub 31 and the high pressure photo-oxidation reaction apparatus 60, pressure sensor-installed digital pressure meters 36*a* and 64*b* for transmitting and receiving analog or digital signals, floatation pressurizing pump 35 and photo-oxidation pressurizing pump 65 of which revolutions can be adjusted, and flow rate adjusting valves 34*c* and 64*c* which operate based on pneumatic or electric motor are installed, respectively. When the pressures of the floatation tub pressurizing pump 35 and the high pressure photo-oxidation reaction apparatus 60, which have direct influences with the solubility of the gaseous ozone and with the floatation capacity of the dissolved ozone/air flotation separation method, are adjusted, it is needed to constantly fix the discharge amount, and the revolutions of the floatation pressurizing pump 35 and the photo-oxidation pressurizing pump 65 are synchronized with the set pressure. In addition, it is preferred to directly check the dissolving degree of the ozone by installing the surface area type flow meters 34*a* and 64*a* for thereby checking the amount of gas contained in the liquid.

The photocatalyst coated supporter 67 filled between the crystal tube 61 having the ultraviolet ray lamp 62 in the interior of the high pressure photo-oxidation reaction apparatus 60 and the photo-oxidation reaction apparatus housing 66 is hollow and made is an egg shaped coil spring 67*a* by which the ultraviolet ray can irradiate via the space between the spring pitches, and the reaction substance flows without pressure loss. When they are filled in the interior of the high pressure photo-oxidation reaction apparatus 60, they are compressed using the tensional force of the coil spring 67*a* and are filled, so that the photocatalyst coated supporters 67 are stably fixed without movements by means of the fluid. So, it is possible to prevent the damage of the crystal tube 61 by means of the collision between the photocatalyst coated supporters 67, and to prevent any loss of the coated photocatalyst 67*d*. The high pressure photo-oxidation reaction apparatus 60 filled with the photocatalyst coated supporter 67 in a shape of the coil spring 67*a* has a large valid reaction surface area for irradiation of the ultraviolet ray as the photocatalyst supporters are arranged in a 3D structure.

In the case that the photocatalyst of the Korean patent number 541573 is coated on a porous plate, the size of the hole formed at the plate is smaller, the surface area may be increased, and then the activation may be enhanced. However, the pressure loss increases, so that it is impossible to increase the treatment capacity. On the contrary, the number of the holes increases or the size of the same is large, the pressure loss may be small, but the reaction surface area is small, so that the activations can be less.

In the present invention, the photocatalyst coated supporters 67 may be filled into the interior of the high pressure photo-oxidation reaction apparatus in a 3D structure, so that the pressure loss is minimized, and the filling intensity may be enhanced. So, as the photocatalyst coated supporters 67 are filled, the surface area increased, and the photocatalyst precursor substances are coated on the outer surface 67*c* tough-processed by means of the sanding work or chemical such as acid with respect to the surface of the coil spring 67*a* and are heat-treated, so that it is possible to enhance the attaching power between the tough processed outer surfaces 67*c* and the photocatalyst 67*d*. Here, with the increased surface area of the tough outer surface 67*c*, the frequency of the photo-oxidation reaction with the pollutant in the dissolved ozone and the waste water can be enhanced, so that the reaction frequency is increased. So, the efficiency of the photo-oxidation decomposition reaction is enhanced, and the waste water decomposition reaction efficiency can be increased.

The floatation tub pressurizing pump 35, which is used for pressurizing along with the waste water for reusing the unreacted ozone collected by the first pretreatment floatation tub 32 and the gas-liquid separation floatation tub 40 based on the dissolved ozone/air floatation separation method, and the photo-oxidation pressurizing pump 65 which pressurizes the ozone supplied from the ozone generator 70 and the waste water processed in the second pretreatment floatation tub 32 may be formed of a horizontal or upright type multistage pump which is able to suck and pressurize the unreacted ozone and the waste water or mat be formed of one among the lobe pump, gear pump, procon pump. In addition, the pressures of the floatation tub pressurizing pump 35 and the photo-oxidation pressurizing pump 65 can be adjusted by adjusting the revolution of the pressurizing pump with set pressures in a state the flow rate is fixed.

In the present invention, there is provided a waste water treatment method using a high pressure advanced oxidation process by using a unreacted ozone which comprises a pressurizing step in which a waste water to be treated is pressurized with a high pressure by means of a photo-oxidation pressurizing pump along with an ozone generated by an ozone generator; a photo-oxidation decomposition step in which a pollutant of the pressurized waste water is decomposed based on a photo-oxidation reaction using a high pressure photo-oxidation reaction apparatus; a unreacted ozone first reuse step in which a high pressure reaction substance of the high pressure photo-oxidation reaction apparatus is inputted into a treatment water of the first treatment waste water and gas-liquid separation flotation tub of the second pretreatment floatation tub, and the floating substance and the pollutant are removed based on a DOF (Dissolved Ozone/Air flotation) method; a unreacted ozone second reuse step in which a gas containing a unreacted ozone collected at the upper sides of the second pretreatment floatation tub and the gas-liquid separation floatation tub is pressurized with a high pressure along with the waste water supplied from the waste water storing tub using the floatation pressurizing pump, and the waste water of the first pretreatment floatation tub inputted from the waste water strong tub is treated based on the dissolved ozone/air flotation method for thereby removing the floating substance and the pollutant; and an ozone decomposition step which decomposes a remaining unreacted ozone discharged from the first pretreatment flotation tub by using an off-gas ozone removing apparatus.

The unreacted ozone first and second reuse steps which reuse a unreacted ozone are implemented by means of the first and second pretreatment floatation tubs and the gas-liquid separation floatation tub so that the unreacted ozone is reused for removing the floating substance and the pollutants in the waste water based on the dissolved ozone/air flotation separation method using the unreacted ozone and air mixed gas; and the dissolved ozone/air floatation separation method of the second pretreatment floatation tub and the gas-liquid separation floatation tub in the unreacted ozone first reuse step are directed to removing the pollutants based on the dissolved ozone/air floatation separation method by inputting an ozone pressurized by the photo-oxidation pressurizing pump and a high pressure reaction substance discharged via the discharge port after the reaction in the high pressure photo-oxidation reaction apparatus into the second pretreatment floatation tub having a waste water and into the gas-liquid separation floatation tub having a treatment water; and in the unreacted ozone second reuse process, the remaining unreacted ozone discharged from the second pretreatment floatation tub and the gas-liquid separation floatation tub are collected, and are pressurized with more than three atmosphere along with the waste water supplied from the waste water storing tub by using the floatation tub pressurizing pump, and the floating substance and the pollutants are removed from the waste water of the first pretreatment floatation tub based on the dissolved ozone/air floatation separation method; and the first and second pretreatment floatation tubs and the gas-liquid separation floatation tub used in the unreacted ozone first and second reuse processes are provided with the scum discharge ports for separating the scum from the water surface and discharging the same.

The floatation tub pressurizing pump used for pressurizing the unreacted ozone along with the waste water for reusing the unreacted ozone collected by the first pretreatment floatation tub and the gas-liquid separation floatation tub based on the dissolved ozone/air floatation separation method and the photo-oxidation pressurizing pump for pressurizing the ozone from the ozone generator and the waste water treated in the second pretreatment floatation tub are one among a horizontal or upright multiple stage pump, a lobe pump, a gear pump and a procon pump for sucking and pressurizing the unreacted ozone or ozone along with the waste water; and the pressures of the floatation tub pressurizing pump and the photo-oxidation pressurizing pump are adjusted by adjusting the revolution of the pressurizing pump with a set pressure in a state that the flow rate is fixed.

In the following, the turbidity of salt water and COD removing effects are compared when the cabbage pickling salt water in the Kimchi factory is treated using the high pressure photo-oxidation decomposition apparatus 60 of the present invention based on the high pressure advanced oxidation process and when it is treated based on the normal pressure advanced oxidation process.

(Experiment)

20 liter of salt water from which foreign substances are removed using a filter is filled in a storing receptacle. 100 ml/min of the ozone contained gas generated by the ozone generator (5 g/hour) and 5 liter/min are sucked using the procon pump and are pressurized up to five atmosphere and are transferred to the photo-oxidation decomposition apparatus provided with the 75 W ultraviolet lamp and the photocatalyst for thereby performing a photo-oxidation decomposition reaction. The discharged high pressure reaction substance is 100% circulated down in the salt storing tub, and the unreacted ozone is reused based on the dissolved ozone/air flotation separation method, and the floated scum is discharged via the air outlet of the upper side of the storing tub along with the air and is removed. In case of the normal pressure advanced oxidation reaction, only the pressure is changed to a normal pressure, and the other conditions are same. The salt water is collected by each time, and the COD and turbidity are checked, and a result is obtained as shown in FIGS. 4 and 5. As a result obtained after purifying the salt waste water having the initial COD of 410 ppm, and the turbidity of 21, a significant difference was obtained as shown in FIG. 4 between the advanced oxidation process using a high pressure photo-oxidation reaction and a conventional normal pressure advanced oxidation process.

INDUSTRIAL APPLICABILITY

In the waste water treatment system and method using a high pressure advanced oxidation process with unreacted ozone reusing according to the present invention, the efficiency of use is enhanced with a unreacted ozone reuse process, and the capacities of the advanced oxidation process waste water treatment apparatus and expensive ozone generator decrease, so that it is possible to significantly decrease the installation and operation costs. The advanced oxidation process waste water treatment apparatus may be made in a compact size. With the above advantages, the present invention may be well adapted to a region where it is not easy to obtain a needed area for a waste water treatment facility such as a city building, factory, apartment, public facility, etc. In addition, it can be well adapted to a heavy water treatment system which cannot use a conventional biological treatment method owing to smell and outer look problems. Further more, the present invention is able to effectively treat in a water purification factory, a golf field and a waste extraction water area in a burying area.

Sequence List Text water, treatment, photocatalyst, photo-oxidation, high pressure

The invention claimed is:

1. A water treatment method, comprising:
a pressurizing step in which a waste water to be treated is pressurized with a high pressure by a photo-oxidation pressurizing pump along with an ozone generated by an ozone generator;
a photo-oxidation decomposition reaction step in which a pollutant of the pressurized waste water is decomposed based on a photo-oxidation reaction using a high pressure photo-oxidation decomposition reaction apparatus;
an unreacted ozone first reuse step in which a high pressure reaction effluent from the high pressure photo-oxidation reaction apparatus is inputted into both a downstream gas-liquid separation flotation tub and an upstream second pretreatment floatation tub, and the floating substances and pollutants are removed from said second pretreatment floatation tub and said gas-liquid flotation tub based on a Dissolved Ozone/Air flotation (DOF) step;

an unreacted ozone second reuse step in which a gas containing unreacted ozone collected at an upper side of the second pretreatment floatation tub and the gas-liquid separation floatation tub is pressurized along with a raw influent waste water supplied from a raw influent waste water storing tub using a floatation pretreatment pressurizing pump and subjecting the raw influent waste water and pressurized unreacted ozone from said second pretreatment floatation tub and said gas-liquid floatation tub to a first pretreatment floatation tub and the waste water of the first pretreatment floatation tub inputted from the raw influent waste water storing tub is treated in the first floatation tub based on the DOF step thereby removing floating substances and pollutants from said first floatation pretreatment tub; and an ozone decomposition step which decomposes a remaining unreacted ozone discharged from the first pretreatment flotation tub by an off-gas ozone removing apparatus, wherein said high pressure photo-oxidation decomposition reaction step comprises said pressure photo-oxidation decomposition reaction apparatus for performing a photo-oxidation decomposition reaction step with a high pressure, said decomposition reaction apparatus includes a tube type housing having a rectangular or circular cross section, and said housing is made of a stainless steel or titanium material, and a housing inlet is connected with the photo-oxidation pressurizing pump and a housing discharge port is connected with a treatment water feedback line and the gas-liquid separation floatation tub, and said decomposition reaction apparatus a crystal fixing unit is provided at an upper side of the housing for accommodating an ultraviolet ray lamp in the interior of the upper side of the housing and for fixing at least one U-shaped crystal tube, and said at least one crystal tube is installed in the housing in a longitudinal direction of the housing, and a photocatalyst coated supporter is filled in an inner space between the at least one crystal tube and the housing, wherein said photocatalyst coated supporter comprises a stainless steel wire or a titanium wire having a diameter of 0.1-5 mm is processed in a coil spring shape, said coil spring shape of the photocatalyst coated supporter is made in a hourglass shape, and the pitch of the spring is smaller than the diameter of the wire, and the pitch of the beginning and ending portions of the spring is near the neighboring pitch, so that the coil spring supporters are not overlapped with each other, and in a sanding work step, the surfaces of the wires are made by colliding sand or diamond sand with a high pressure air, and in a heat treatment step, the wire is coated and is heat-treated at below 800° C.

2. A water treatment method, comprising:

a pressurizing step in which a waste water to be treated is pressurized with a high pressure by a photo-oxidation pressurizing pump along with an ozone generated by an ozone generator;

a photo-oxidation decomposition reaction step in which a pollutant of the pressurized waste water is decomposed based on a photo-oxidation reaction using a high pressure photo-oxidation decomposition reaction apparatus;

an unreacted ozone first reuse step in which a high pressure reaction effluent from the high pressure photo-oxidation reaction apparatus is inputted into both a downstream gas-liquid separation flotation tub and an upstream second pretreatment floatation tub, and floating substances and pollutants are removed from said second pretreatment floatation tub and said gas-liquid flotation tub based on a Dissolved Ozone/Air flotation (DOF) step;

an unreacted ozone second reuse step in which a gas containing unreacted ozone collected at an upper side of the second pretreatment floatation tub and the gas-liquid separation floatation tub is pressurized along with a raw influent waste water supplied from a raw influent waste water storing tub using a floatation pretreatment pressurizing pump and subjecting the raw influent waste water and pressurized unreacted ozone from said second pretreatment floatation tub and said gas-liquid floatation tub to a first pretreatment floatation tub and the waste water of the first pretreatment floatation tub inputted from the raw influent waste water storing tub is treated in the first floatation tub based on the DOF step thereby removing floating substances and pollutants from said first floatation pretreatment tub; and an ozone decomposition step which decomposes a remaining unreacted ozone discharged from the first pretreatment flotation tub by an off-gas ozone removing apparatus, wherein said off-gas ozone removing apparatus comprises a photocatalyst decomposition step for decomposing and removing said unreacted ozone based on a photo-oxidation decomposition reaction by employing a photocatalyst coated onto one selected from the group consisting of active charcoal, metallic net, and metallic coil spring wherein said photocatalyst are placed so as to surround an ultraviolet lamp installed at a center of a stainless steel tube through which the unreacted ozone passes and said ozone is irradiated by an ultraviolet ray onto the photocatalyst.

3. A water treatment method, comprising:

a pressurizing step in which a waste water to be treated is pressurized with a high pressure by a photo-oxidation pressurizing pump along with an ozone generated by an ozone generator;

a photo-oxidation decomposition reaction step in which a pollutant of the pressurized waste water is decomposed based on a photo-oxidation reaction using a high pressure photo-oxidation decomposition reaction apparatus;

an unreacted ozone first reuse step in which a high pressure reaction effluent from the high pressure photo-oxidation reaction apparatus is inputted into both a downstream gas-liquid separation flotation tub and an upstream second pretreatment floatation tub, and floating substances and pollutants are removed from said second pretreatment floatation tub and said gas-liquid flotation tub based on a Dissolved Ozone/Air flotation (DOF) step;

an unreacted ozone second reuse step in which a gas containing unreacted ozone collected at an upper side of the second pretreatment floatation tub and the gas-liquid separation floatation tub is pressurized along with a raw influent waste water supplied from a raw influent waste water storing tub using a floatation pretreatment pressurizing pump and subjecting the raw influent waste water and pressurized unreacted ozone from said second pretreatment floatation tub and said gas-liquid floatation tub to a first pretreatment floatation tub and the waste water of the first pretreatment floatation tub inputted from the raw influent waste water storing tub is treated in the first floatation tub based on the DOF step thereby removing floating substances and pollutants from said first floatation pretreatment tub; and an ozone decomposition step which decomposes a remaining unreacted ozone discharged from the first pretreatment flotation tub by an off-gas ozone removing apparatus, wherein said high pressure photo-oxidation decomposition reaction step comprises said pressure photo-oxidation decomposition reaction apparatus for performing a photo-oxidation decomposition reaction step with a high pressure, said decomposition reaction apparatus includes a tube type housing having a rectangular or circular cross section, and said housing is made of a stainless steel or titanium material, and a housing inlet is connected with the photo-oxidation pressurizing pump and a housing discharge port is connected with a treatment water feedback line and the gas-liquid separation floatation tub, and said decomposition reaction apparatus a crystal fixing unit is provided at an upper side of the housing for accommodating an ultraviolet ray lamp in the interior of the upper side of the housing and for fixing at least one U-shaped crystal tube, and said at least one crystal tube is installed in the housing in a longitudinal direction of the housing, and a photocatalyst coated supporter is filled in an inner space between the at least one crystal tube and the housing, wherein said ultraviolet ray lamp is a low pressure or high pressure Ag ultraviolet lamp which emits UV-C 254 nm wavelength or an intermediate ultraviolet ray lamp which emits a ultraviolet ray of UV-A, B, C wavelengths, and a stabilizer system is installed for turning on the ultraviolet lamp with a single output or for variably adjusting the output of the ultraviolet lamp by 5-120%, wherein said photocatalyst coated supporter comprises a stainless steel wire or a titanium wire having a diameter of 0.1-5 mm is processed in a coil spring shape, said coil spring shape of the photocatalyst coated supporter is made in a hourglass shape, and the pitch of the spring is smaller than the diameter of the wire, and the pitch of the beginning and ending portions of the spring is near the neighboring pitch, so that the coil spring supporters are not overlapped with each other, and in a sanding work step, the surfaces of the wires are made by colliding sand or diamond sand with a high pressure air, and in a heat treatment step, the wire is coated and is heat-treated at below 800° C.

* * * * *